United States Patent [19]
Beland et al.

[11] Patent Number: 6,108,473
[45] Date of Patent: Aug. 22, 2000

[54] OPTICAL FIBER CABLE WITH BEND-LIMITING GEL

[75] Inventors: Wayne D. Beland, Northwood; Craig Edward Murphy, Dover, both of N.H.

[73] Assignee: Tyco Sumarine Systems, Ltd, Eatonwn, N.J.

[21] Appl. No.: 09/120,394

[22] Filed: Jul. 22, 1998

[51] Int. Cl.[7] ........................................... G02B 6/44
[52] U.S. Cl. ........................ 385/113; 385/100; 385/109; 385/103
[58] Field of Search ............................. 385/113, 100–114

[56] References Cited

U.S. PATENT DOCUMENTS 4,786,137  11/1988  Cornelison et al. .................... 385/113
5,384,880   1/1995  Keller et al. ........................... 385/114

*Primary Examiner*—Phan T. H. Palmer

[57] ABSTRACT

An optical fiber cable structure includes a central kingwire and a plurality of fibers disposed to surround the kingwire. Microbending losses are accommodated by surrounding each individual fiber with a thin gel layer. The plurality of fibers are embedded in a solid (rubbery) polymer to provide the required strength. In one embodiment, the central cable structure is further surrounded by a layer of foamed polymer to provide for an absorbing interface between the solid polymer and the steel wire strands surrounding the cable structure.

7 Claims, 1 Drawing Sheet

OPTICAL FIBER CABLE WITH BEND-LIMITING GEL

BACKGROUND OF THE INVENTION

The present invention relates to an optical fiber cable structure and, more particularly, to a cable structure incorporating a gel material to reduce microbending losses.

In the manufacture of optical fiber cables, one or more optical fibers are typically surrounded by sheathing and strength members, as required, to enable manufacture, installation and operation of the cable while preventing damage to the optical fibers. For example, steps are typically taken to prevent buckling of the optical fibers due to compressive longitudinal forces during manufacture or subsequently during the lifetime of the cable, in order to prevent significant microbending losses from occurring. Microbending losses increase the attenuation of the optical radiation in the fibers, limiting the length of transmission in a fiber; see, for example, the article entitled "Microbending Loss in Optical Fibers" by Gardner, appearing in the *Bell System Technical Journal,* Vol. 54, No. 2, pages 457–465, February 1975. One type of cable construction is shown in U.S. Pat. No. 4,241,979, where microbending losses are substantially reduced or prevented by decoupling the optical fibers from the surrounding cable. That is, the optical fibers, typically formed into ribbons, are placed inside an inner sheath with sufficient space between the ribbons and the sheath to prevent longitudinal forces on the sheath from substantially acting on the fibers. In addition, the ribbons are given a slight twist to reduce bending losses.

When optical fiber cables are deployed in undersea systems, the cables must be protected to prevent the ingress of water. Suitable waterblocking materials in use must yield under strains experienced when the cable is made or handled. Otherwise, movement of the optical fibers within the cable would be prevented and the fibers would buckle because they contact, with a relative small periodicity, a surface of the unyielding filling material. The smaller the periodicity of the fibers when contacting such an unyielding surface, the greater the potential for microbending loss.

Typically, microbending loss in undersea optical fiber cables is more difficult to control at long wavelengths than at short wavelengths. Thus, the requirements on the mechanical properties of a fiber cable filling material are typically substantially more severe for the cable that is to be used at 1.55 μm, for example, than they are if the cable is to be used at shorter operating wavelengths of 1.3 μm, for example.

In one exemplary fiber cable design, disclosed in U.S. Pat. No. 4,952,012, a thinwall alloy tube is used to encase a plurality of optical fibers, and a water resistant gel is inserted through the tube and is used to fill any interstices between the individual fibers. While this design produces little or no added transmission loss due to fiber bending, it provides less than full support to the fibers and allows some undesirable fiber movement when the cable is held in tension or relaxed after tensioning.

SUMMARY OF THE INVENTION

The need remaining in the prior art is addressed by the present invention, which relates to an optical fiber cable structure and, more particularly, to a cable structure incorporating a gel material to reduce microbending-induced attenuation in optical fibers.

In accordance with the present invention, each individual optical fiber is encased by a relatively thin gel layer sufficient to prevent fiber bending. The fibers are then disposed to surround a central kingwire and are embedded in a solid (rubbery) polymeric material. The gel properties and thickness are selected to provide adequate support to the fiber, while at the same time isolating the encapsulated fiber from any bending which could otherwise be induced by manufacturing, installation, and recovery activities.

In one exemplary embodiment of the invention, the cable is surrounded by a layer of foamed polymer. The foamed polymer is used as an interface between the inner cable structure and the steel wires typically stranded around the exterior of the cable. The use of the foam interface is considered to provide adequate shear coupling between the surfaces, while the foam properties strongly limit distortion of the solid polymer filling material within the optical fiber cable structure.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

The following detailed description relates to an optical fiber cable design and, more particularly to the design of an arrangement referred to in the art as a "unit fiber structure", or UFS. Simply stated, the UFS is the central-most portion of an optical fiber cable, particularly a cable deployed for undersea communications. The complete cable structure includes additional outer layers of sheathing and strength members and while not illustrated here, are considered to be part of the final cable structure.

Figure 1:
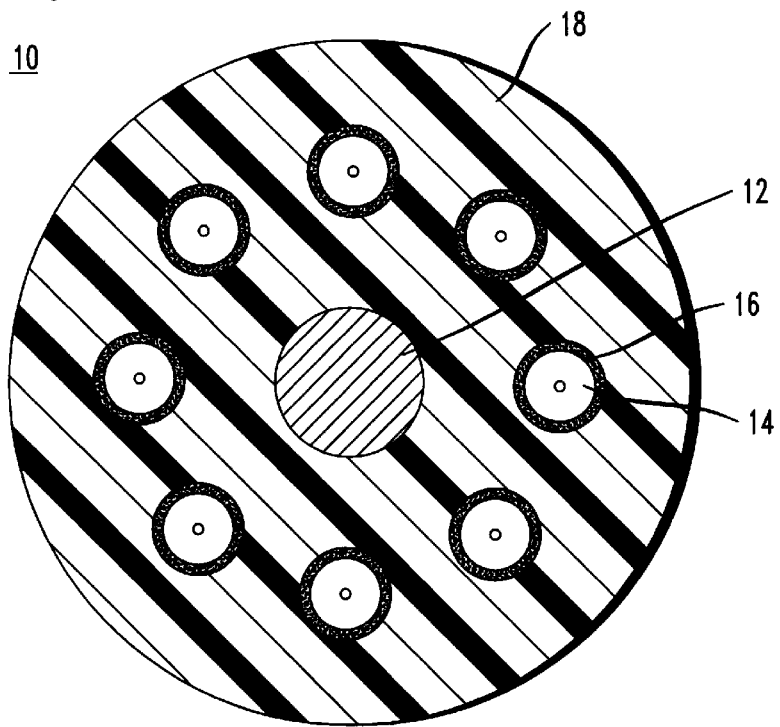
FIG. 1 illustrates a cross-sectional view of an exemplary unit fiber structure incorporating the individual fiber gel layers of the present invention.

Referring now to FIG. 1, an exemplary UFS 10 is illustrated. UFS 10 includes a centrally-disposed kingwire 12 which is used as the longitudinal strength member of the UFS. Kingwire 12 may comprise a steel wire or any other suitable material. Surrounding kingwire 12 is a plurality of optical fibers 14. In accordance with the present invention, each optical fiber 14 is encased by a gel layer 16. The properties and thickness of gel layer 16 are chosen to provide adequate support to fiber 14. Suitable materials for gel layer 16 include thixotropic gels with viscosities up to approximately 400,000 centipoise. In accordance with the present invention, the gel may be applied to form a layer having a thickness in the range of, for example, 0.002–0.010" and is applied over optical fiber 14 immediately prior to embedding fiber 14 in support structure described below.

The plurality of gel-surrounded optical fibers are embedded in a support structure 18 formed of a solid polymeric material, such as a UV-curable acrylate. Support structure 18 maintains the plurality of fibers 14 in a "tightly coupled" structure, as required for undersea deployment. Advantageously, the individual gel layers 16 surrounding each fiber isolate the individual fibers from mechanical forces during manufacturing, installation and recovery activities.

In most conventional fiber cables, the UFS is surrounded by a layer of steel wires that are stranded in a helical pattern.

Figure 2:
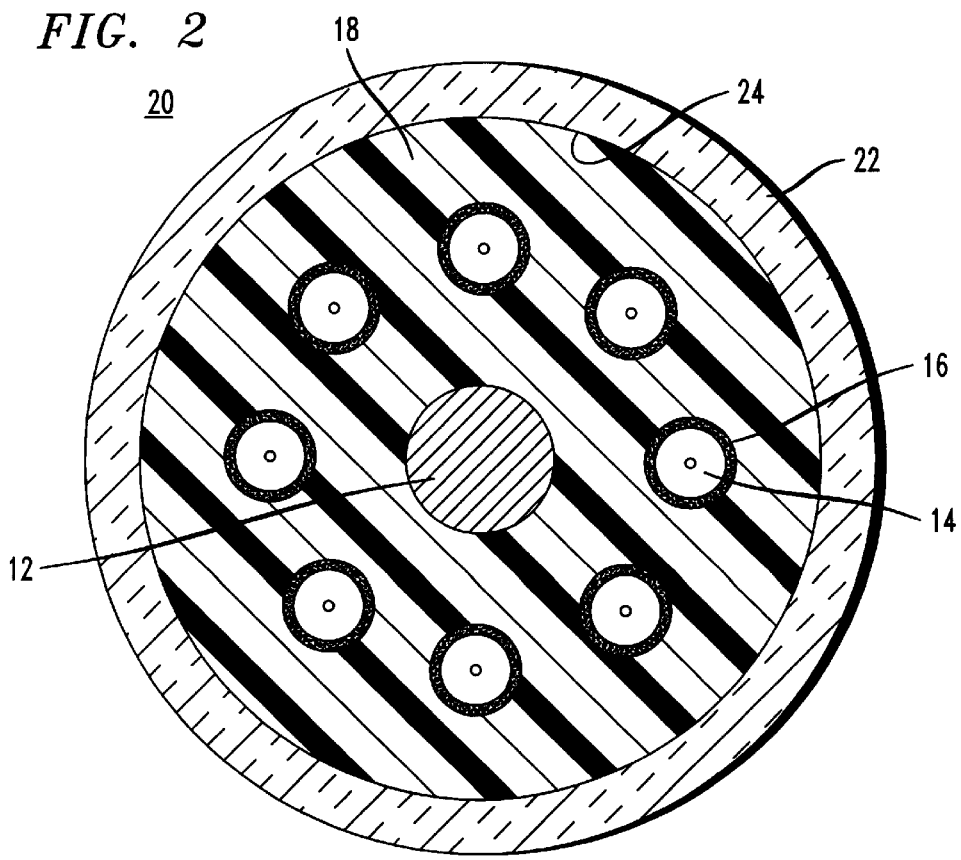
FIG. 2 illustrates an embodiment of the present invention including an outer foamed polymer layer.

In order to provide a good mechanical shear coupling between the wires and the UFS, there is typically a small interference between the wires and the UFS surface. Dimensional variations of the steel wire and UFS may introduce bending losses in the optical fibers. An arrangement of the present invention, illustrated in FIG. 2, addresses this additional source of bending loss. In particular, FIG. 2 illustrates an exemplary UFS 20, where UFS 20 includes the same internal components as discussed above in association with FIG. 1. In the embodiment of FIG. 2, a foamed polymeric layer 22 is disposed to surround outer surface 24 of UFS 20. For example, aerated UV-curable materials may be used to form the foamed polymeric layer 22. The physical interference between foamed layer 22 and the steel wires (not shown) is considered to provide adequate shear coupling, while the properties of the foam are useful in reducing distortion of solid polymer 18 and kingwire 12. In a preferred embodiment, polymeric layer 22 is formed to comprise a thickness in the range of 0.001"0.0250".

It is to be understood that the above-described embodiments are exemplary only. For example, various other materials may be used to form gel layer 16, solid polymer 18 and foamed polymer 22. All are considered to fall within the spirit and scope of the present invention as defined by the claims appended hereto.

What is claimed is:

1. An optical fiber cable comprising at least one unit fiber structure characterized in that the at least one unit fiber structure comprises a centrally disposed kingwire;

a plurality of optical fibers disposed around said centrally disposed kingwire, each optical fiber of said plurality of optical fibers surrounded by an individual gel layer of a predetermined thickness; and a solid polymer material disposed to fill the at least one unit fiber structure and embed therein said plurality of gel-surrounded optical fibers.

2. An optical fiber cable as defined in claim 1 wherein the at least one unit fiber structure further comprises a foamed polymeric layer disposed to surround said at least one unit fiber structure.

3. An optical fiber cable as defined in claim 2 wherein the foamed polymeric layer comprises a thickness in the range of 0.001–0.025".

4. An optical fiber cable as defined in claim 2 wherein the foamed polymeric layer comprises an aerated UV-curable acrylate.

5. An optical fiber cable as defined in claim 1 wherein the solid polymer material comprises a UV-curable acrylate.

6. An optical fiber cable as defined in claim 1 wherein the optical fiber gel layer is formed to comprise a thickness in the range of approximately 0.002–0.010".

7. An optical fiber cable as defined in claim 1 wherein the optical fiber gel layer comprises a thixotropic gel material with a viscosity up to approximately 400,000 centipoise.

\* \* \* \* \*